United States Patent
O'Neil

(12) 
(10) Patent No.: US 6,827,543 B2
(45) Date of Patent: Dec. 7, 2004

(54) MODULAR MOTORCYCLE STOWING DEVICE FOR A TRUCK BED

(76) Inventor: James W. O'Neil, 38 W. Warrick St., Knightstown, IN (US) 46148

( * ) Notice: Subject to any disclaimer, the term of this patent is extended or adjusted under 35 U.S.C. 154(b) by 0 days.

(21) Appl. No.: 10/304,217

(22) Filed: Nov. 26, 2002

(65) Prior Publication Data

US 2004/0101390 A1 May 27, 2004

(51) Int. Cl.$^7$ ................................................ B60R 9/00
(52) U.S. Cl. ........................ 414/537; 414/462; 414/477; 414/480; 224/413; 14/69.5
(58) Field of Search ................................ 414/537, 538, 414/462–466, 477–480; 224/402, 403, 413; 14/69.5

(56) References Cited

U.S. PATENT DOCUMENTS

| | | | | |
|---|---|---|---|---|
| 3,687,318 A | * | 8/1972 | Casey et al. ................ 414/462 |
| 3,777,921 A | | 12/1973 | Nelson ........................ 214/450 |
| 3,843,001 A | * | 10/1974 | Willis ......................... 414/462 |
| 3,912,139 A | * | 10/1975 | Bowman ...................... 410/3 |
| 4,032,167 A | | 6/1977 | Chereda ..................... 280/106 |
| 4,490,089 A | | 12/1984 | Welker ....................... 414/483 |
| 4,511,181 A | | 4/1985 | Schantz ......................... 298/5 |
| 5,394,583 A | | 3/1995 | Plate .......................... 14/69.5 |
| 5,553,762 A | | 9/1996 | Brown ........................ 224/403 |
| 5,556,249 A | | 9/1996 | Heine ......................... 414/500 |
| 5,570,898 A | | 11/1996 | Albert ........................ 280/656 |
| 5,649,802 A | | 7/1997 | Babcock ..................... 414/483 |
| 5,730,577 A | | 3/1998 | Jones ......................... 414/462 |
| 5,810,546 A | | 9/1998 | Schmoling .................. 414/538 |
| 5,846,047 A | | 12/1998 | Riekki ........................ 414/493 |
| 5,934,863 A | | 8/1999 | Beck .......................... 414/538 |
| 5,938,397 A | | 8/1999 | Schouest ..................... 414/537 |
| 6,059,496 A | | 5/2000 | Stevens ......................... 410/7 |
| 6,065,914 A | | 5/2000 | Fotou ............................ 410/3 |
| 6,089,816 A | | 7/2000 | Christ ........................ 414/538 |
| 6,099,232 A | | 8/2000 | Dixon et al. ................ 414/494 |
| 6,109,494 A | | 8/2000 | Pilmore ...................... 224/547 |
| 6,149,372 A | | 11/2000 | Lee et al. ................... 414/538 |
| 6,176,672 B1 | | 1/2001 | Egan et al. ................. 414/462 |
| 6,186,727 B1 | | 2/2001 | Hamilton .................... 414/426 |
| 6,287,069 B1 | | 9/2001 | Oliphant et al. ............ 414/426 |
| 6,345,950 B1 | * | 2/2002 | Gerwitz ...................... 414/537 |
| 6,352,401 B1 | | 3/2002 | LeMay ....................... 414/463 |
| 6,354,777 B1 | | 3/2002 | Riekke ........................ 410/3 |
| 6,357,991 B1 | | 3/2002 | Hamlett ..................... 414/538 |
| 6,413,033 B1 | * | 7/2002 | Monroig, Jr. ............... 414/480 |
| 2002/0031422 A1 | * | 3/2002 | Schilling ..................... 414/477 |

* cited by examiner

Primary Examiner—Kathy Matecki
Assistant Examiner—Mark A. Deuble
(74) Attorney, Agent, or Firm—Woodard, Emhardt, Moriarty, McNett & Henry LLP

(57) ABSTRACT

A modular motorcycle stowing device for transporting a motorcycle in the bed of a pickup truck includes a collapsible base which is designed to fit on the floor of a pickup truck bed and a collapsible upper ramp which is hingedly connected to the base and provides a guiding channel for receiving the front and rear tires of the motorcycle to be stowed in the device. In order to span the elevation between the ground and the pickup truck bed, a detachable loading ramp is provided and arranged for a sliding interfit into the upper ramp. Connected to the loading ramp is a footboard for supporting an assisting individual. Connected to the upper ramp is a winch which is used to assist in pulling the motorcycle up into the stowing device and for more controlled unloading of the motorcycle.

5 Claims, 10 Drawing Sheets

MODULAR MOTORCYCLE STOWING DEVICE FOR A TRUCK BED

BACKGROUND OF THE INVENTION

The present invention relates in general to transporting devices and apparata for use in stowing and transporting a personal use vehicle from one location to another. More specifically, the present invention relates to a motorcycle stowing device which is modular in its construction and is able to be assembled into a pickup truck bed and disassembled when not being used for motorcycle transporting. Once disassembled, the modular motorcycle stowing device can be loaded into the bed of the pickup truck or placed in separate storage if the period of non-use is for an extended interval. Motorcycle owners and operators often have a need to transport their motorcycles by means of some other vehicle. The two primary transporting devices include a pickup truck with a stowing device and a trailer which is towed by another vehicle, such as a car or pickup truck.

One of the considerations in the design of a suitable stowing device for a motorcycle is the degree of security which is provided such that the motorcycle is not damaged while being transported. It is also important to provide a device which allows the motorcycle to be safely loaded and unloaded from the transporting vehicle without damage and without introducing significant problems or difficulties to the user. The ease, safety, and security are all important considerations when using the bed of a pickup truck for motorcycle transporting as well as when towing the motorcycle on a trailer.

Another design consideration for a motorcycle stowing device is whether the transporting vehicle, such as a pickup truck, is going to have to be permanently modified, customized, or altered. Ideally, the pickup truck would retain its original configuration so that it could still be used, in all respects, as a pickup truck, without permanent modifications or alterations. A still further design consideration for a motorcycle stowing device is the ability to disassemble and store the device when not in use. Importantly, the assembly and disassembly of the present invention is able to be accomplished without the need for fasteners or the use of hand tools. While there are selected prior art stowing devices which appear to focus on other design considerations such as reducing the overall weight of the stowing device, the degree or extent of design versatility to accommodate different vehicles, material options, and a lower overall cost, nothing in the prior art appears to focus on the benefits or advantages of a modular construction in the same way as the present invention.

One of the advantages of a modular construction is to permit the convenient transporting of the component parts, collapsed and/or unassembled. Importantly, the assembly and disassembly of the present invention is able to be accomplished without the need for fasteners or the use of hand tools. If the present invention is transported in the bed of a pickup truck, it should be possible to have space left for transporting other items. The modular construction of the present invention also enables the disclosed motorcycle stowing device to be conveniently stored when not in use. A still further advantage of a modular construction is the ability to replace one component part that might wear out or be damaged without having to replace an entire larger subassembly or alternatively perform a more costly repair. As will be described, the modular construction of the present invention provides these various advantages.

As will be described, a still further advantage of the modular construction of the present invention is the option of using two upper ramps members with a common (single) base. While the base helps to support the motorcycle, its role is not as important in that regard when a smaller, lighter weight motorcycle is being transported. In this situation, i.e., the transporting of a smaller, lighter weight motorcycle, the present invention contemplates the use of two ramp members to enable transporting two motorcycles concurrently.

When a motorcycle is stowed in the bed of a pickup truck, for the purpose of safely transporting the motorcycle from one location to another, several prior art devices are constructed and arranged to be securely attached to the bed of the truck. While this securing technique (i.e., direct attachment) might provide a desired degree of strength and rigidity, it effectively eliminates any other use for the truck bed, whether or not a motorcycle is actually stowed in the device.

One of the "required" accessories for a motorcycle stowing device which is mounted into the bed of a pickup truck is some type of ramp to span the elevation distance or the separation between the ground and the pickup truck tailgate. When not in use during loading and unloading of the motorcycle, the ramp is typically stored in the bed of the pickup truck. The ramp takes up space in the truck bed which further contributes to the fact that the truck bed is effectively unavailable for any other function, when the stowing device is attached.

A further concern with the use of a motorcycle stowing device which is attached directly to or into the truck bed is the type or extent of truck bed modifications which might be required and the permanent nature of such modifications. If the bed of the truck has to be modified to incorporate clearance holes, tapped holes, eyebolts, etc., these are permanent modifications that remain, even after the stowing device is removed. If the stowing device includes supports and/or bracketry that remain attached to the truck, these are also permanent modifications. All of this could be seen as a disadvantage, particularly to those pickup truck owners who do not want to permanently modify their trucks.

For those individuals that own both a pickup truck and a motorcycle and who do not want to permanently modify their trucks, but who also want the option of stowing and transporting their motorcycles, the present invention provides an ideal solution. The present invention is also ideal for any pickup truck owner who may, on occasion, need to stow and transport a motorcycle, either as a business enterprise or to assist a friend. A pickup truck owner can (individually) install the present invention into his pickup truck bed, load, stow, and safely transport a motorcycle without making any permanent modifications or alterations to the pickup truck. The modular nature of the present invention provides the ability to use the invention in different types of vehicles as well as in multiple vehicles of the same type. When not in use, the modular nature of the present invention allows it to be disassembled and stored, returning the pickup truck to its original configuration and condition. The present invention provides an improvement to the field of motorcycle transporting in a novel and unobvious manner.

SUMMARY OF THE INVENTION

A modular motorcycle stowing device for transporting a motorcycle in the bed of a pickup truck according to one embodiment of the present invention comprises a base, a support ramp pivotally connected to the base, a loading ramp detachably assembled to the support ramp, and at least one support panel connected to the loading ramp.

One object of the present invention is to provide an improved motorcycle stowing device.

Related objects and advantages of the present invention will be apparent from the following description.

DESCRIPTION OF THE PREFERRED EMBODIMENTS

Figure 1:
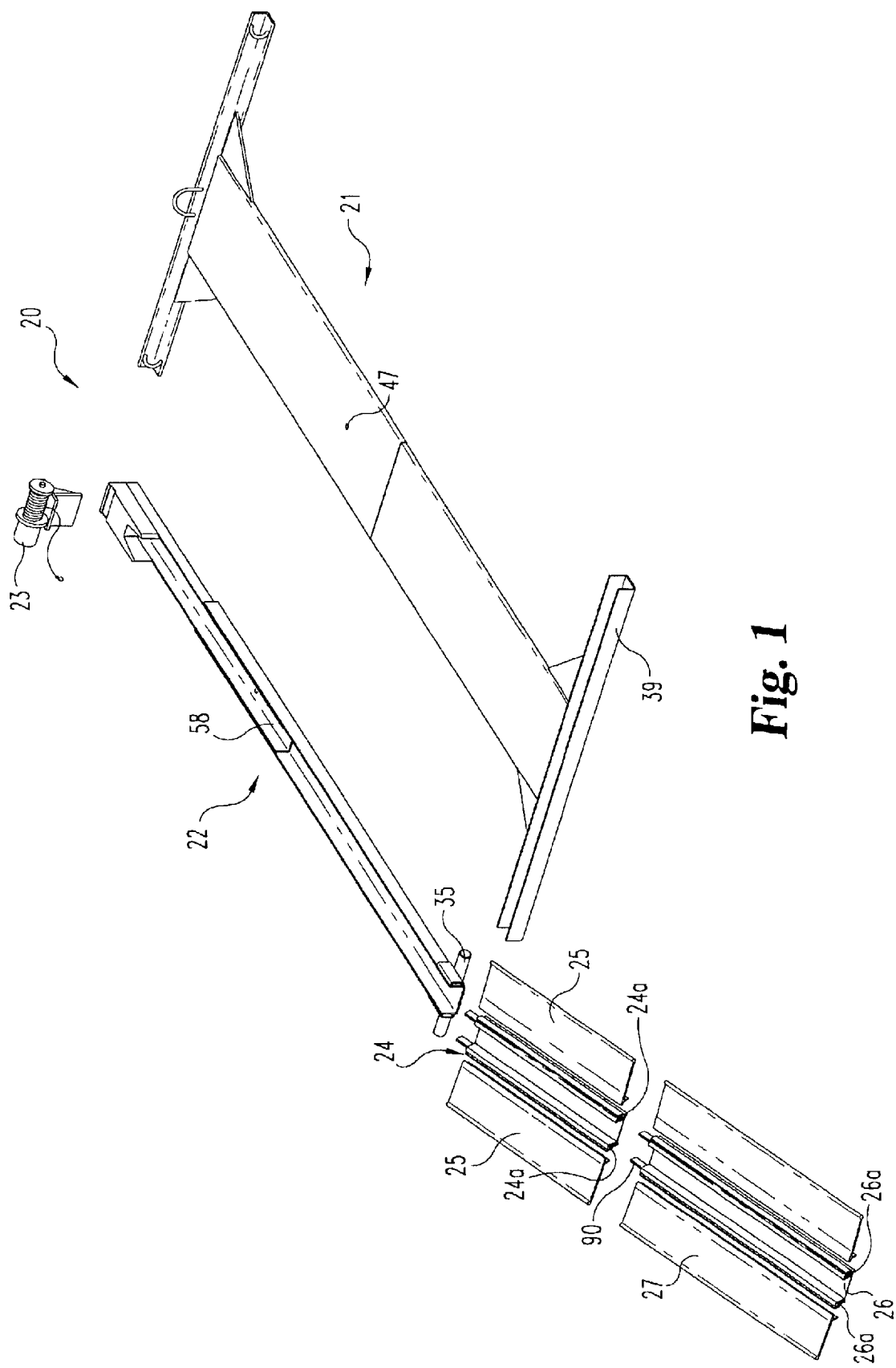
FIG. 1 is an exploded perspective view of a modular stowing device for transporting a motorcycle according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated (as an exploded view) a modular motorcycle stowing device 20 according to the present invention. Stowing device 20 is constructed and arranged to be positioned in a pickup truck bed for transporting a motorcycle. The use of an exploded view for the FIG. 1 illustration is intended to help describe the modular nature of stowing device 20. While some of the component parts which comprise stowing device 20 can be modified within the teachings of the present invention so as to be combined with other components, the FIG. 1 illustration is intended to show the preferred modular construction for maximum versatility, including the preferred construction for handling and storage convenience.

Stowing device 20 includes telescoping, collapsible base 21, collapsible upper ramp 22, winch 23, upper loading ramp 24, two upper footboards 25, lower loading ramp 26, and two lower footboards 27. The collapsible base (see FIG. 2) includes a forward portion 31 which receives, in a sliding telescoping manner, rear portion 32. Once the forward portion 31 and the rear portion 32 are slidingly set to the desired end-to-end overall length, the two portions are moved to the desired length and stabilized with a locking pin. The collapsible upper ramp 22 (see FIG. 3) includes a forward portion 33 which receives, in a sliding telescoping manner, rear portion 34. Once the forward portion 33 and the rear portion 34 are slidingly set to the desired end-to-end overall length, the two portions are pinned together. The telescoping length of collapsible base 21 is set so as to extend from the front of the pickup bed to the upper edge of the tailgate which becomes the rear edge when lowered. By setting the length of the collapsible base 21 to this dimension, the connection of the upper loading ramp 24 and its use in loading the motorcycle does not interfere with the tailgate of the pickup truck.

Figure 1A:
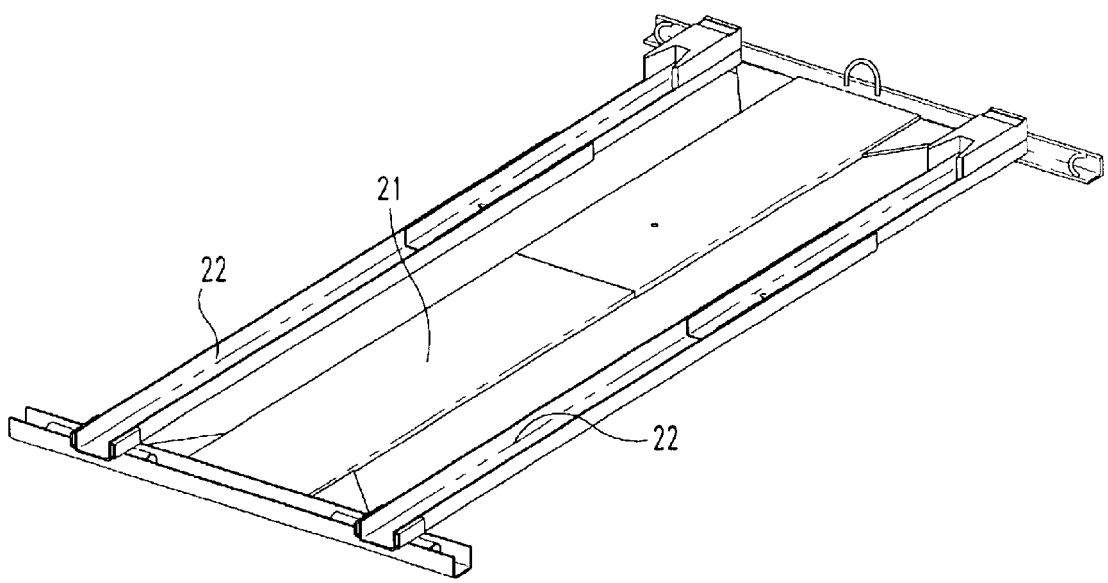
FIG. 1A is a perspective view of an alternate embodiment of the present invention using two upper ramps.

The collapsible base 21 is positioned in the bed of a pickup truck and while the preferred embodiment is described in the context of a "short bed" truck, the length of the various component parts of stowing device 20 can be changed to accommodate different sizes and styles of truck beds. The present invention is suitable for and compatible with a long bed tuck as well as various vans and panel trucks. The hinge bar 35 of collapsible upper ramp 22 assembles into base channel 39 of the collapsible base 21. As illustrated in FIG. 1A, it is envisioned that two upper ramps can be used with one collapsible base for transporting two motorcycles concurrently.

The upper loading ramp 24 is constructed and arranged to assemble into the collapsible upper ramp 22. Each upper footboard 25 assembles onto the upper loading ramp 24 by means of an interfit with a corresponding one of extruded side channels 24a that extend lengthwise on opposite sides of upper loading ramp 24.

The lower loading ramp 26 is constructed and arranged to assemble into upper loading ramp 24. Each lower footboard 27 assembles onto the lower loading ramp 26 by means of an interfit with a corresponding one of extruded side channels 26a that extend lengthwise on opposite sides of lower loading ramp 26.

It should be understood that the construction of upper loading ramp 24 and the interfit assembly of the two footboards 25 is virtually identical to the construction of lower loading ramp 26 and the interfit assembly of the two lower footboards 27. Likewise, the connection of the upper loading ramp 24 into the upper ramp 22 is virtually identical to the connection of the lower loading ramp 26 into the upper loading ramp 24. While the actual structures may be slightly different as far as their respective lengths, as will be explained, the basic interfit of one ramp into the other is by means of male/female connections, each connection point using an insert extension and cooperating receiving pocket.

The hinge connection between the upper ramp 22 and base 21 by way of hinge bar 35 and base channel 39 allows the upper ramp to pivot about hinge bar 35. The same is true if two upper ramps are used. With the lower loading ramp 26 assembled into the upper loading ramp 24 and with the upper loading ramp 24 assembled into the upper ramp, a lever-like mechanism is created such that the angle of incline of the loading ramp portion of device 20 depends on the combined length of the upper and lower loading ramps, as assembled together. This loading ramp assembly is used in order to span the vertical distance between the ground (or the surface supporting the motorcycle) and the bed of the truck. The preferred form of the loading ramp assembly includes an upper loading ramp 24, two upper footboards 25, a lower loading ramp 26, and two lower footboards 27. The rearward edge 26b of the lower loading ramp is pivoted so as to contact the ground or the support surface for the motorcycle. The overall length of the loading ramp assembly is effectively the hypotenuse of a right triangle with the apex located generally at the location of hinge bar 35.

Figure 1B:
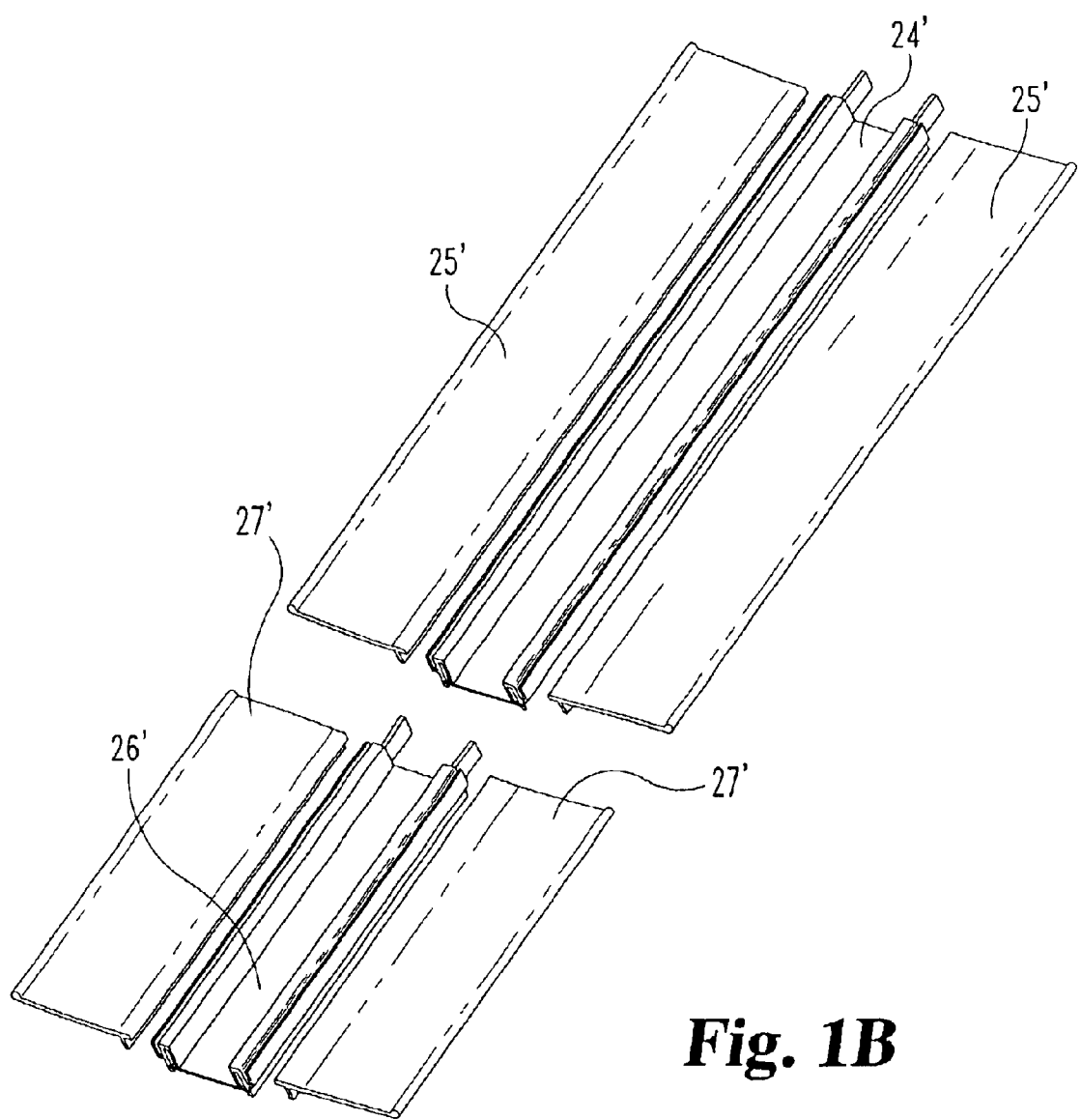
FIG. 1B is a perspective view of an alternate loading ramp structure for the present invention.

In view of the anticipated overall weight of the loading ramp assembly, its modular construction is important in order to be able to easily and safely separately handle the individual parts. The modular construction enables the use of two loading ramp sections, including upper loading ramp 24 and lower loading ramp 26 which connect together as described, in order to create the overall loading ramp length. The modular construction also includes the use of separate footboards, noting that there are two upper footboards 25 for the upper loading ramp 24 and two lower footboards 27 for the lower loading ramp 26. In FIG. 1, the apportioned length for the upper and lower loading ramps and their corresponding footboards is shown in a first configuration option where the upper loading ramp 24 and the lower loading ramp 26 are of similar length, although the lower loading ramps is approximately one foot longer than the upper loading ramp. The same length apportionment applies to the corresponding and cooperating pair of footboards for each loading ramp portion. In the second configuration option of FIG. 1B, the respective loading ramp lengths are not similar in length. The same length ratios or apportionment applies to the corresponding and cooperating footboards of the FIG. 1B option. The lower loading ramp 26 preferably includes a reinforced (lower) rearward edge due to the loading impact as the motorcycle contacts the lower loading ramp 26. The preferred overall loading ramp length is nine feet and is preferably divided such that neither loading ramp section is over five feet in length. Adopting a design with this maximum length helps to control and limit the overall weight of each loading ramp section so as to keep each loading ramp section at a weight level for safe and easy handling. The alternate embodiment of FIG. 1B shows the upper loading ramp 24' with a length of approximately six feet and the lower loading ramp 26' with a length of approximately three feet. While these corresponding lengths could be reversed and while the specific length measurements could change, the point to be understood with regard to the alternatives expressed in FIG. 1 and FIG. 1B is that the upper and lower loading ramp sections need to cooperate in total length to equal approximately nine feet and need to be short enough, individually, depending on the construction and materials, so that they can be easily lifted, connected and disconnected, and stored. The cooperating upper footboards 25' have the same corresponding length as the loading ramp portion that they assemble into. The cooperating lower footboards 27' likewise have the same overall length approximating the loading ramp section that they cooperate with. In the illustrated example which has been given, the upper footboards 25' would have a length of approximately six feet with the lower footboards 27' would have a length of approximately three feet.

The described loading ramp assembly is used in combination with the upper ramp 22 for loading a motorcycle. If two upper ramps 22 are used in a single truck bed, the same (single) loading ramp assembly is used with each upper ramp. After the first motorcycle is loaded onto a first one of the two upper ramps 22, the loading ramp assembly is disconnected from the first upper ramp and then assembled or connected to the second upper ramp for loading the second motorcycle.

Another aspect of using the overall length and weight of the loading ramp assembly is the moment arm and weight distribution for the lever-like mechanism. As the motorcycle is pushed or pulled up the lower loading ramp 26 (or ramp 26') and then onto the upper loading ramp 24 (or ramp 24'), the motorcycle remains on the low side of the lever arm rearward of hinge bar 35. When the motorcycle begins to move onto upper ramp 22, the weight distribution begins to change. As more of the motorcycle weight moves forward of hinge bar 35, the weight distribution and moment arms change and the upper ramp 22 begins to pivot down in the direction of base 21. Continuing advancement of the motorcycle onto upper ramp 22 ultimately causes the upper ramp to rotate down into contact with base 21. The rate of pivoting movement is governed by the rate of travel of the motorcycle and, to some extent, by the weight of the ramp members and the footboards on the opposite side of the "fulcrum" (i.e., hinge bar 35) and the moment arm length (based on the nine foot length).

Figure 2:
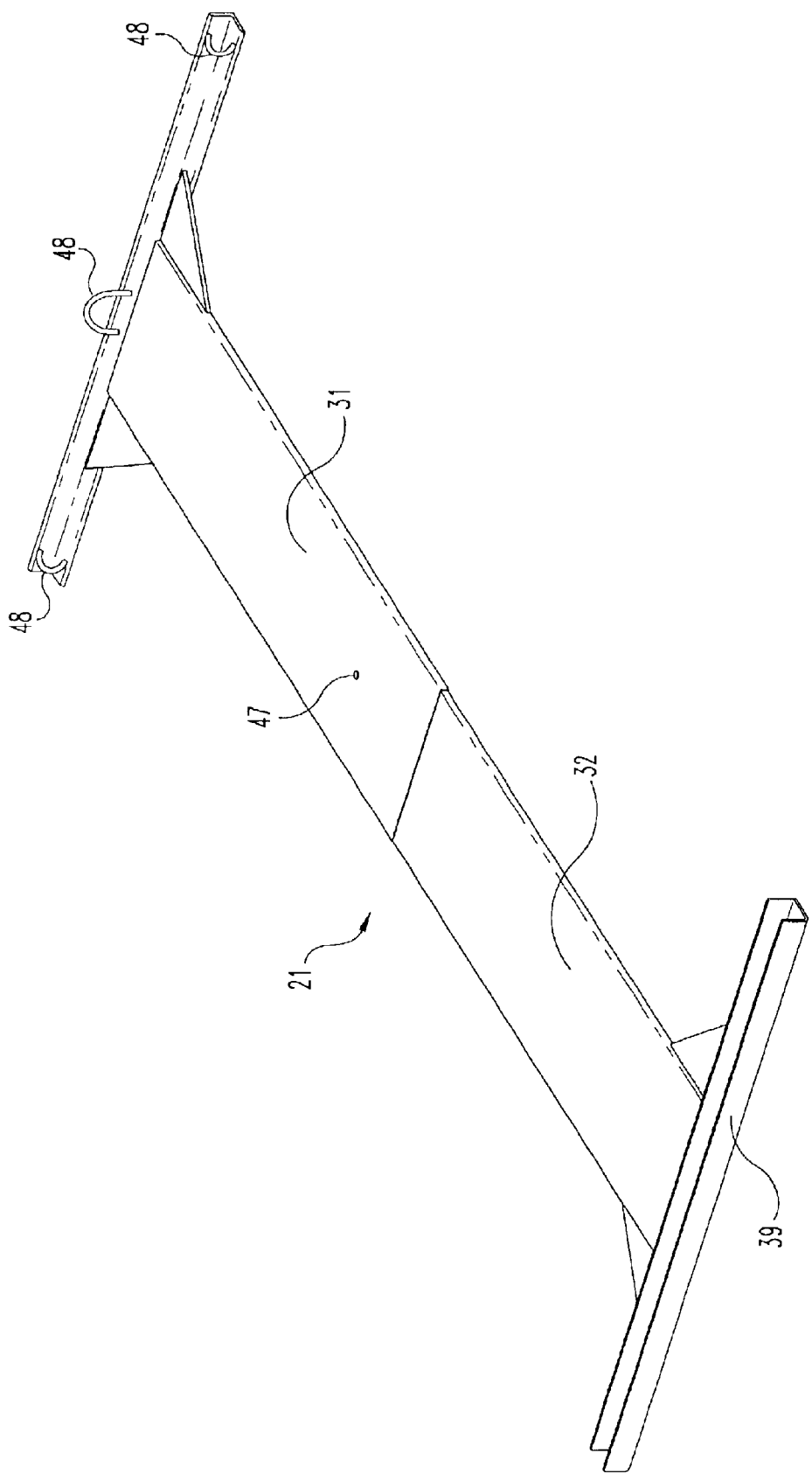
FIG. 2 is a perspective view of a telescoping, collapsible base comprising one modular component of the FIG. 1 stowing device.
Figure 9:
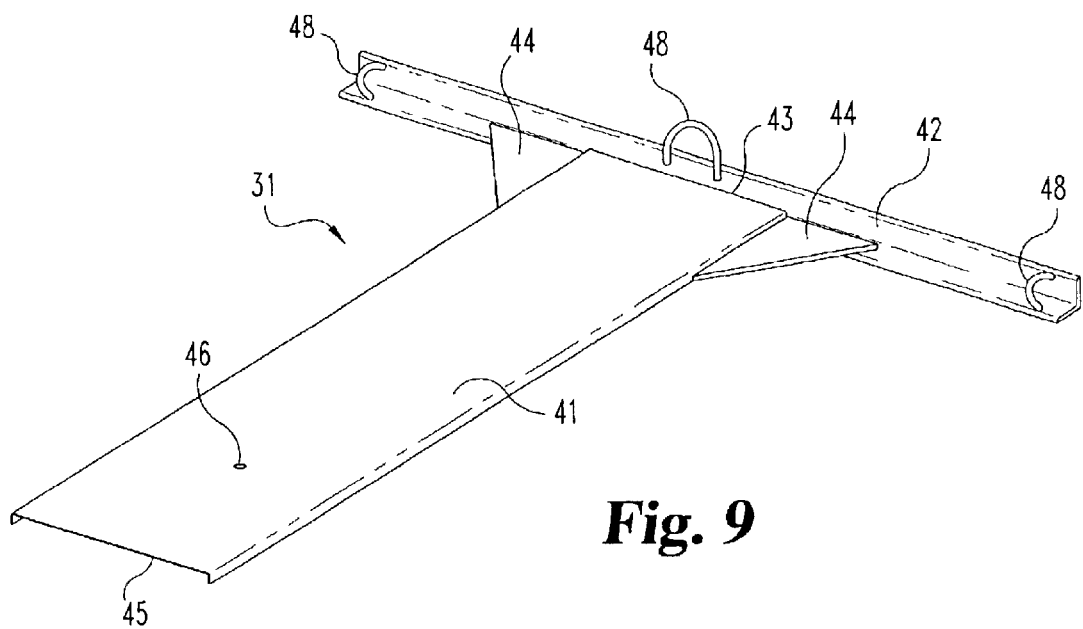
FIG. 9 is a perspective view of one portion of the FIG. 2 collapsible base

Referring to FIG. 2, the details of the collapsible base 21 are illustrated. Forward portion 31 (see FIG. 9) includes a base panel 41 and a cross brace 42. These two components are welded together and are preferably fabricated out of aluminum. Cross brace 42 is an L-shaped angle with each leg measuring approximately 3 inches in width. The right angle design of cross brace 42 enables a rectangular forward end 43 of panel 41 to fit squarely therein for welding. Gussets 44, which are welded in place, provide additional strength to portion 31 and in particular for the joint between base panel 41 and cross brace 42.

Cross brace 42 is approximately 4 feet in length so as to be able to clear the wheel wells on a pickup truck bed. This permits the forward portion 31 to be slid into position and pulled out in a reverse direction, while still clearing the wheel wells and without having to tilt, angle, or elevate any portion of this component. Tie-down loops 48 are anchored to cross brace 42 so as to provide points of connection for auxiliary straps, cables and bungy cords which may be used to secure the motorcycle (or motorcycles) to the stowing device 20 and/or the stowing device 20 to the truck.

Base panel 41 measures approximately 14 inches wide and has a length dimension of approximately 60 inches. Base panel 41 is a three-sided, channel-like structure which is open at end 45 in order to telescopingly receive rear portion 32 (see FIG. 10). Hole 46 is used to receive a locking pin 47 so as to fix the longitudinal position of rear portion 32 in forward portion 31. It is contemplated that the hollow, channel-like interior of the base panel 41 will be reinforced with support spacers in order to maintain its rectangular shape and the size of its hollow interior, even under the weight of a motorcycle.

Figure 10:
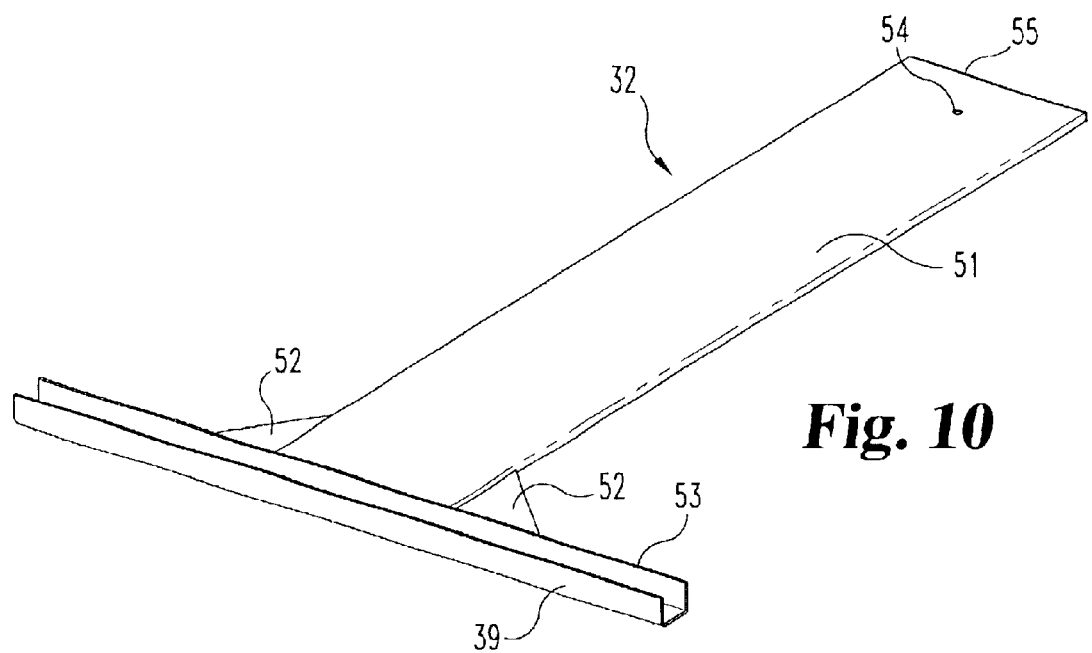
FIG. 10 is a perspective view of the other portion of the FIG. 2 collapsible base.

With reference to FIG. 10, the details of rear portion 32 are illustrated. Rear portion 32 includes an insertion panel 51, a U-shaped base channel 39, and a pair of oppositely disposed gussets 52. The U-shaped base channel 39 opens upwardly and the insertion panel 51 abuts up against wall 53 and that joint is welded to permanently affix panel 51 to channel 39. The gussets 52 are positioned to span the right angled corners between the panel 51 and wall 53 and the gussets 52 are welded in this position.

Panel 51 includes a locking pin hole 54 and end 55 is sized to fit inside of end 45 of base panel 41. By sliding panel 51 into end 45 until hole 54 lines up with hole 46, the desired length of collapsible base 21 is set. Preferably, cross brace 42 is positioned adjacent the front of the truck bed and the base channel 39 is located at the rear edge of the pickup truck tailgate, with the tailgate down. With this length set and the two holes lined up, the locking pin 47 is inserted to set the combined length of forward portion 31 and the rear portion 32. By positioning the base channel 39 at the rear edge of the (down) tailgate, the upper loading ramp 24 does not interfere with the tailgate. If the base channel 39 is too far forward, there could be interference. If the base channel 39 is back too far such that it is not supported by the tailgate, the overall strength of device 20 during the loading and unloading of the motorcycle could be compromised.

Figure 3:
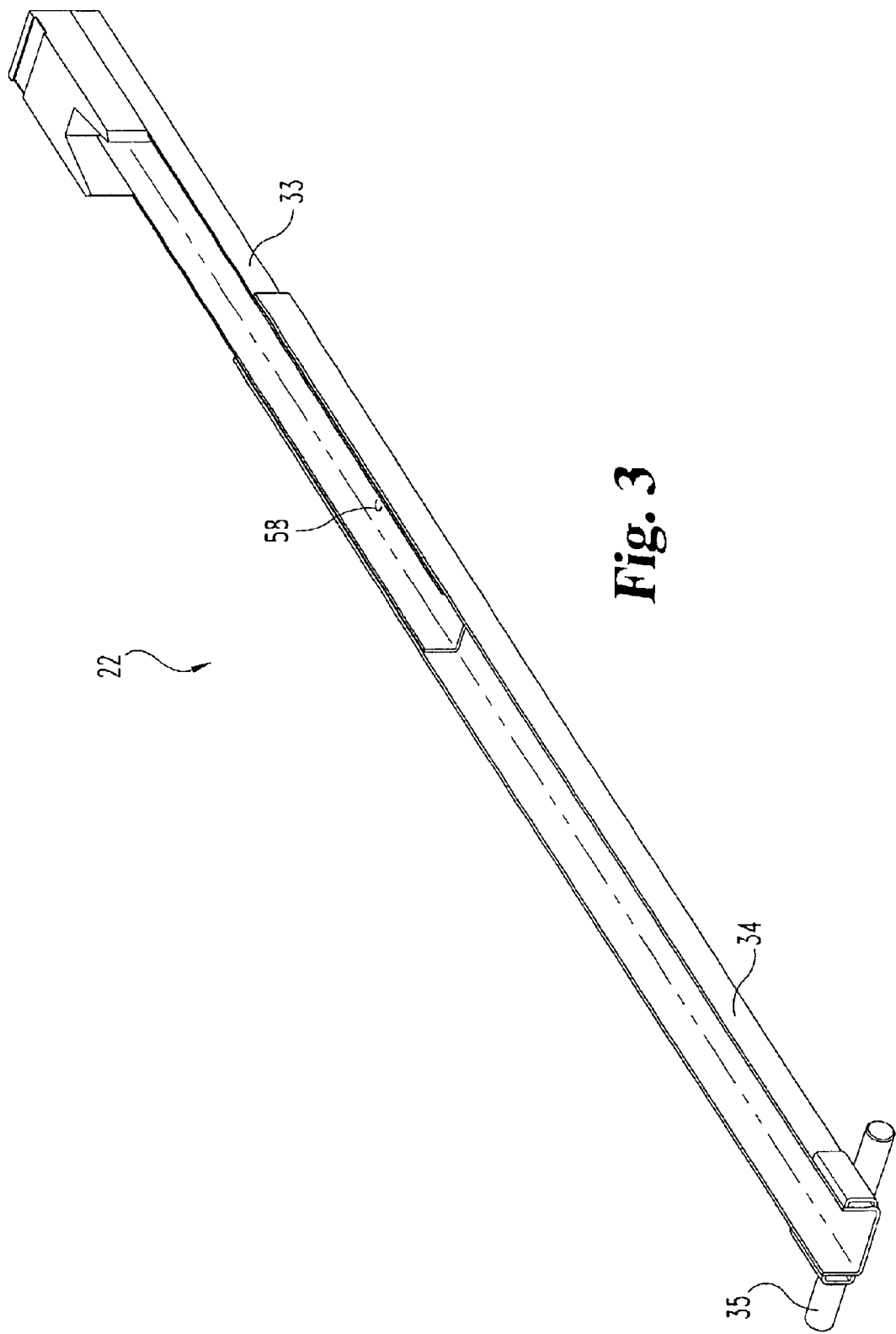
FIG. 3 is a perspective view of an upper ramp comprising one component of the FIG. 1 stowing device.
Figure 11:
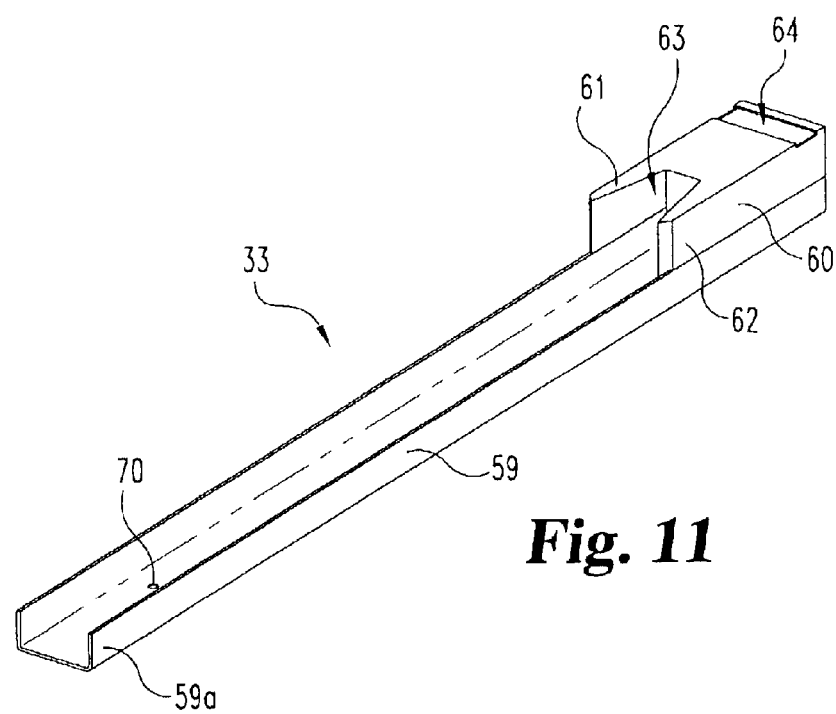
FIG. 11 is a perspective view of one portion of the FIG. 3 upper ramp.
Figure 12:
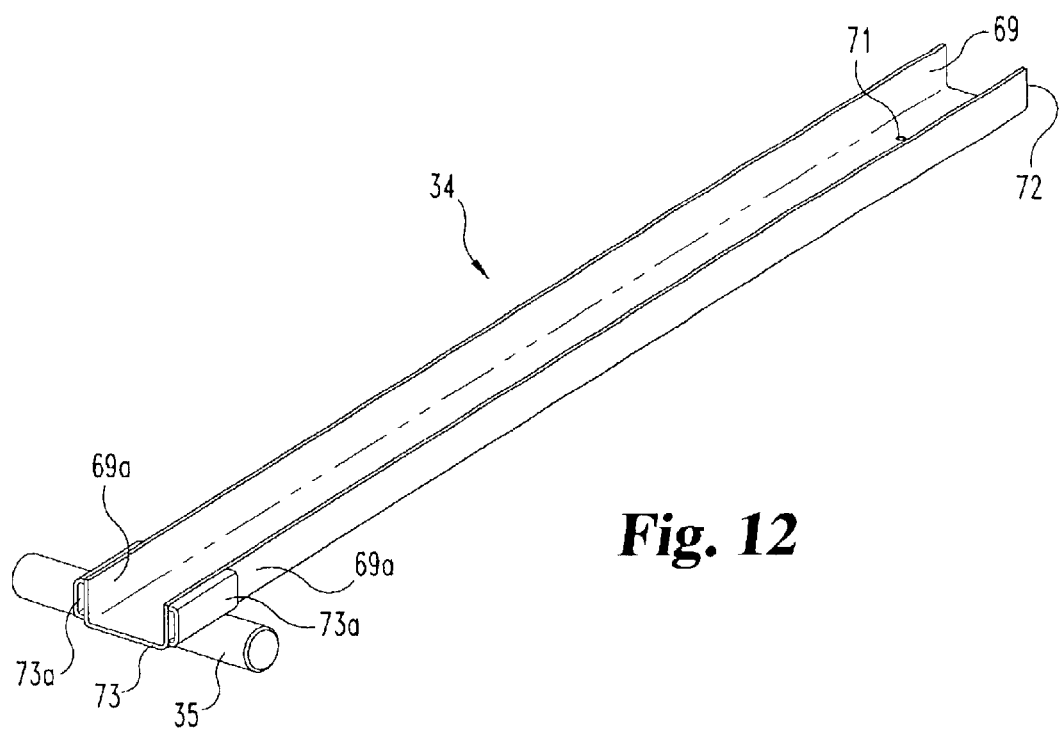
FIG. 12 is a perspective view of the other portion of the FIG. 3 upper ramp.

Referring now to FIG. 3, the details of the collapsible upper ramp 22 are illustrated. Upper ramp 22 includes a forward portion 33 (see FIG. 11) which slideably fits within rear portion 34 (see FIG. 12). The sliding fit of forward portion 33 within rear portion 34 is by means of U-shaped sections (opening upwardly) which are compatibly sized (and shaped) for one to slideably fit within the other with a near line-to-line fit. Once the desired (longitudinal) length of the upper ramp is set, the locking pin 58 is used to secure together the forward portion 33 and the rear portion 34 at that desired overall length. By fitting the forward portion 33 within the rear portion 34 any cantilever effect due to the weight of the motorcycle as it is loading is offset to some extent by the weight and moment arm of forward portion 33.

Figure 8:
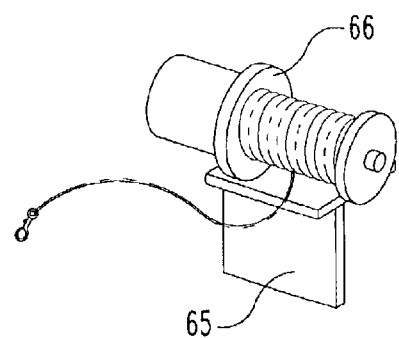
FIG. 8 is a perspective view of a winch comprising one component of the FIG. 1 stowing device.

Forward portion 33 includes U-shaped channel 59 and receiving block 60 which is constructed and arranged to receive the front tire of the motorcycle to be stowed on and in device 20. Block 60 includes sidewalls 61 and 62 and tapered receiving channel 63 therebetween. The forwardmost end of block 60 defines a clearance pocket 64 which is constructed and arranged to securely receive the winch mount 65 of winch 66 (see FIG. 8). Winch mount 65 is a flat plate which is securely attached to winch 66. The clearance pocket 64 is closely sized and shaped to receive winch mount 65 with a sliding fit. This arrangement allows the winch mount 65 to simply be inserted down into pocket 64 in order to mount the winch into the collapsing upper ramp 24.

The winch 66 is operated by vehicle (pickup truck) power and can be constructed and arranged for remote-controlled operation by means of a hand-held transmitter. A wire cable from the winch spool is used to hook onto the motorcycle in order to assist in pulling the motorcycle up the loading ramp assembly and then forward onto the upper ramp 22. While the winch is pulling the motorcycle, the individual helps to push and guide the motorcycle as it travels up the loading ramp assembly and forward onto the upper ramp 22. Ultimately, the front tire of the motorcycle wedges into channel 63 while the rear tire is captured within the U-shaped channel 69 of rear portion 34 or alternatively within the U-shaped channel 59 of forward portion 33. The determination of which U-shaped channel actually receives the rear tire of the motorcycle is based on the selected lengths for U-shaped channels 59 and 69, the extent of overlap as part of their sliding fit, and the tire-to-tire distance for the particular motorcycle. Once the desired extent of overlap of the two U-shaped channels is determined, this controls to some extent where pinning holes 70 and 71 are located for receipt of locking pin 58.

The forward end 72 of channel 69 is received by the rearward end 59a of channel 59 of forward portion 33. The rearward end 73 of channel 69 includes hinge bar 35 which is bolted to the bottom surface of end 73. A pair of oppositely disposed receiving pockets 73a in the shape of enclosed rectangular channels are constructed and arranged outboard of the sides 69a of channel 69. Each pocket 73a can be bolted or riveted to the outer surface of the corresponding sides 69a or alternatively can be welded in position. The receiving pockets 73a are constructed and arranged to receive (by insertion) connecting portions of the upper loading ramp 24.

Figure 4:
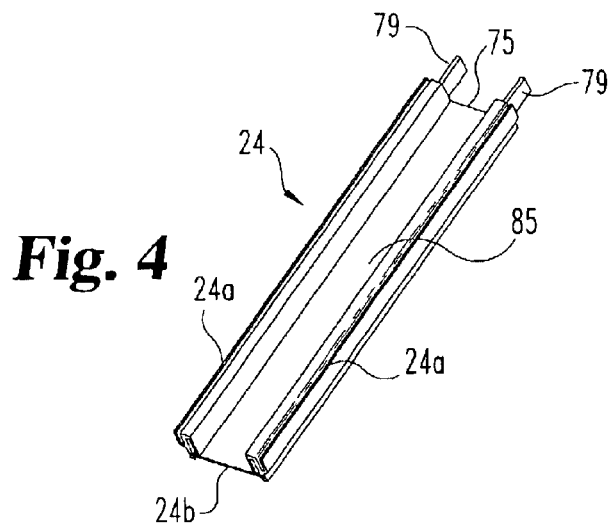
FIG. 4 is a perspective view of an upper loading ramp comprising one component of the FIG. 1 stowing device.
Figure 5:
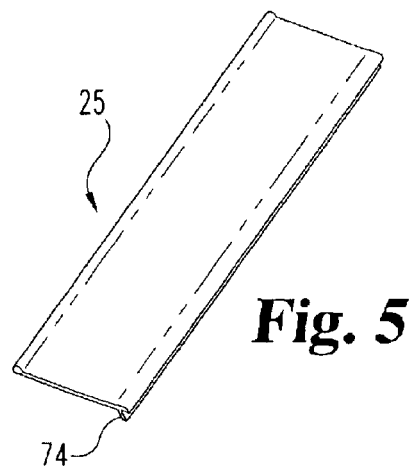
FIG. 5 is a perspective view of an upper footboard comprising one component of the FIG. 1 stowing device.

Referring now to FIGS. 4 and 5, the upper loading ramp 24 and one upper footboard 25, respectively, are illustrated. The longitudinally-extending side channels 24a of loading ramp 24 are separately extruded components, preferably aluminum, that have a unique cross sectional (lateral) shape (see FIG. 13). This cross sectional shape is specifically configured to receive a leg portion 74 of a corresponding one of the upper footboards 25 (see FIG. 14).

The pair of side channels 24a extend the full length of upper loading ramp 24 from upper end 75 to lower (rearward) end 24b. Extending from the end of each side channel 24a adjacent upper end 75 is a corresponding insertion portion or bayonet 79, previously described as the connecting portion which is constructed and arranged to insert into a corresponding one of the receiving pockets 73a. By creating a close clearance fit between each bayonet 79 and its corresponding pocket 73a, the upper loading ramp 24 is able to be inserted into the upper ramp 22 and maintain that connected status during use and during the loading and unloading of a motorcycle onto and off of stowing device 20. When it is time to disassemble the loading ramp 24 from the upper ramp 22, the upper loading ramp is simply pulled out of the described interfit with the upper ramp. Once disconnected, the upper loading ramp is able to be loaded into the pickup truck bed to be reused at the destination for the motorcycle or stored if the transporting of the motorcycle is completed and device 20 is to be removed from the pickup truck.

Figure 13:
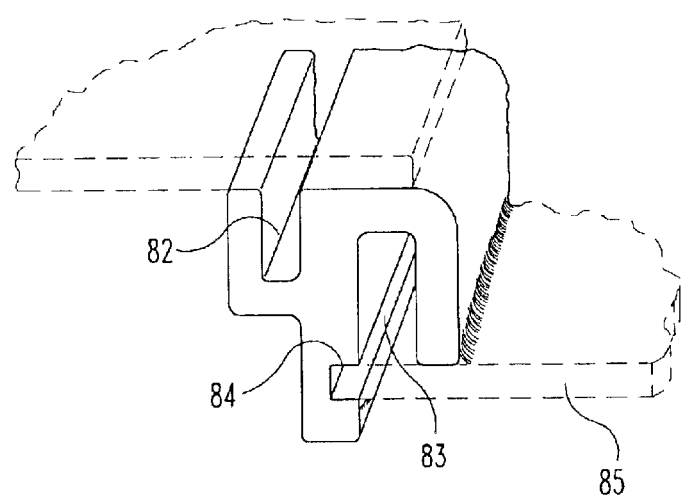
FIG. 13 is a partial, perspective view of a side channel comprising one component of the FIG. 4 upper loading ramp.
Figure 14:
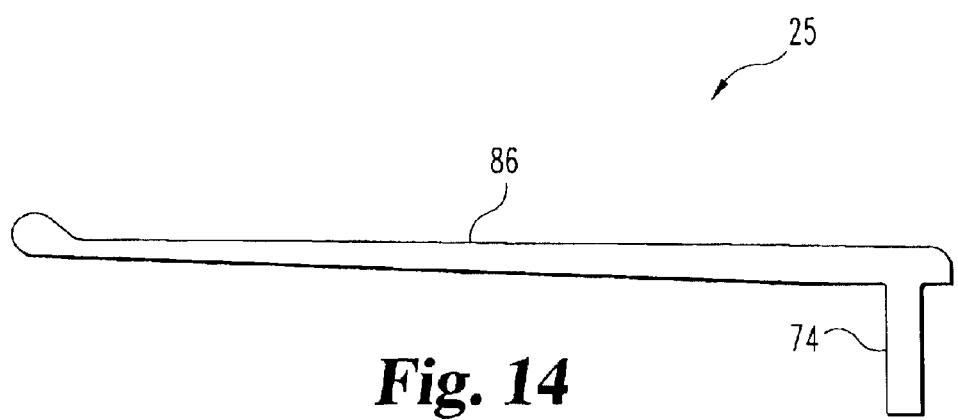
FIG. 14 is an end elevational view of the FIG. 5 upper footboard.

With continued reference to FIG. 13, the cross sectional shape of each side channel 24a includes a generally rectangular footboard portion 82, a bayonet-receiving portion 83, and a ramp-receiving portion 84. The ramp-receiving portion 84 is constructed and arranged to receive an edge of plate 85 which is the base and support surface of loading ramp 24. In the preferred embodiment of the present invention, the plate 85 is welded to the extruded side channel 24a. The same construction is applicable to upper loading ramp 24' and lower loading ramps 26 and 26'. An alternative to the welded construction of the plate 85 to the side channel 24a is to use a sliding fit/interfit scheme.

Figure 6:
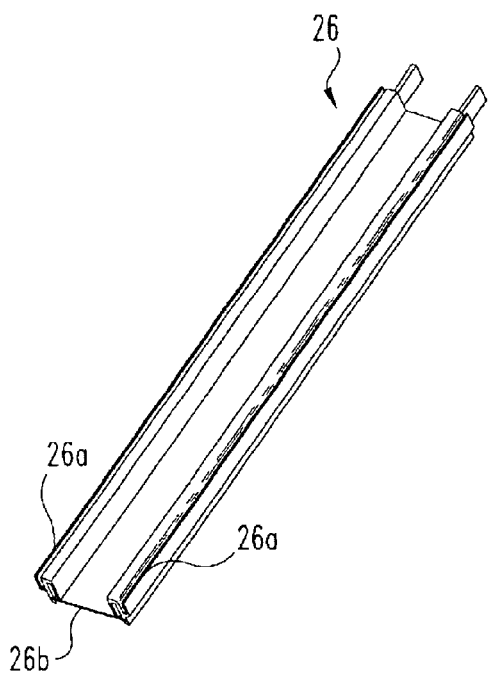
FIG. 6 is a perspective view of a lower loading ramp comprising one component of the FIG. 1 stowing device.
Figure 7:
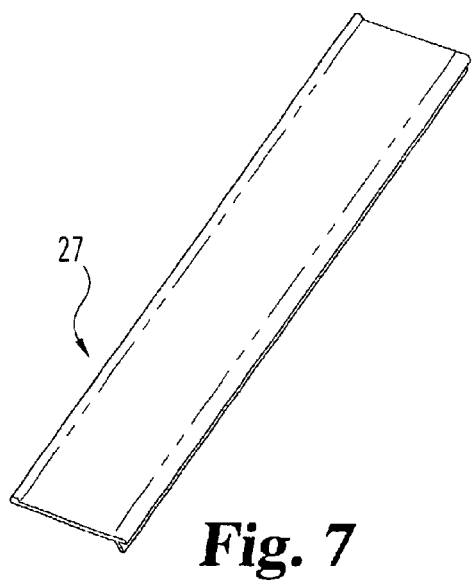
FIG. 7 is a perspective view of a lower footboard comprising one component of the FIG. 1 stowing device.

The leg portion 74 of each footboard (see FIG. 14) is constructed and arranged to closely fit into portion 82, also with a sliding fit. The support shelf 86 of each footboard is inclined upwardly as it extends outwardly, away from leg portion 74. As would be understood, when standing on shelf 86, the weight of the individual creates a moment arm force which tries to lift channel 24a. This in turn applies a moment arm force to the plate 85. However, the weight of the various members, and the interfit of ramp 24 into ramp 22 allows the footboards to support the weight of the individual. Normally, the individual is only standing on the footboard(s) when loading or unloading a motorcycle, and the weight of the motorcycle provides more than enough counterweight to keep the entire device, including the motorcycle, steady and secure. This same construction is applicable in all respects to lower footboard 27. The lower loading ramp 26 (see FIG. 6) and the two lower footboards 27 (see FIG. 7) are constructed and arranged similar to upper loading ramp 24 and its two footboards 25, respectively, except for the preferred length.

Figure 15:
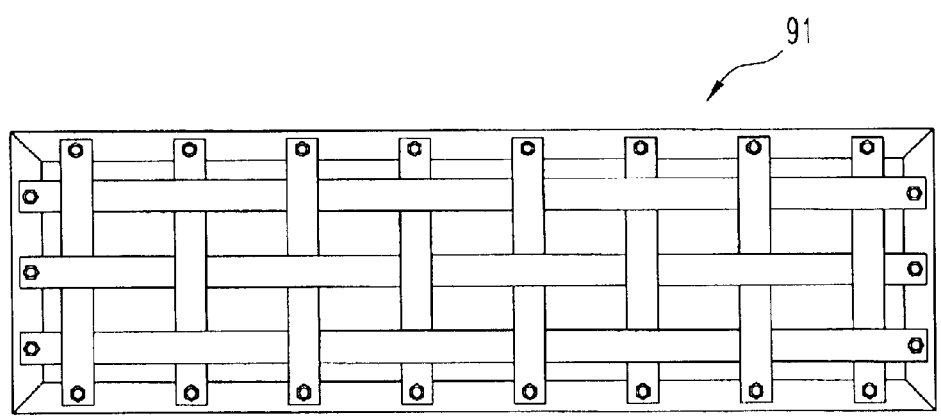
FIG. 15 is a top plan view of an alternate footboard construction.

A further option for the present invention is to redesign each footboard 25, 25', 27 and 27' with a woven pattern of nylon strapping material, closely spaced so as to support an individual standing thereon (see FIG. 15). This allows the weight of the footboard 91 to be reduced while still providing a sturdy and reliable support surface for the individual(s) to use while loading or unloading the motorcycle(s).

Figure 16:
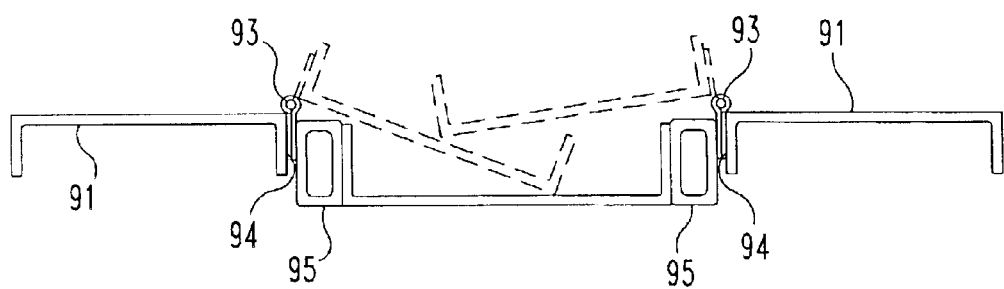
FIG. 16 is an end elevational view of an alternate footboard and ramp assembly according to the present invention.

Another option for the present invention is to style each footboard 91 such that it is hinged to the corresponding ramp. This option would be applicable to upper loading ramps 24, 24' and to lower loading ramps 26, 26'. This hinged construction is illustrated in FIG. 16 wherein a continuous hinge 93 is connected to the upper surface of the ramp side channel and to a portion of the footboard. Once assembled, the left side footboard is able to pivot in a clockwise direction to fold up into the interior of the ramp against the base plate. The right side footboard is able to pivot in a counterclockwise direction to fold up onto the top of the left side footboard. The inner surface 94 of each footboard is used to abut up against the side channels 95 as a way to brace each footboard and help keep it generally horizontal while in use.

By using aluminum for virtually all of the component parts of stowing device 20, the weight is reduced compared to steel and any concerns regarding corrosion are virtually eliminated. The entire device is able to be disassembled due to the modular construction and this permits easy transporting as well as easy storage. Everything will fit easily into a pickup truck bed, whether or not a motorcycle is being transported.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A modular motorcycle stowing device for transporting a motorcycle in a vehicle, said motorcycle stowing device comprising:

a collapsible base constructed and arranged for placement in said vehicle, said collapsible base including two primary portions with one portion telescopingly received within the other portion;

a collapsible motorcycle support ramp pivotally connected to said base, said collapsible motorcycle support ramp including two primary sections with one section telescopingly received within the other section, wherein one of said two primary sections includes a hinge bar, and wherein one of said two primary portions includes a receiving channel for receipt of said hinge bar;

a loading ramp detachably assembled to said support ramp, said loading ramp including a pair of side channels and a cooperating base plate; and at least one support panel connected to said loading ramp wherein said at least one support panel is constructed and arranged to insert into one of said side channels.

2. A modular motorcycle stowing device for transporting a motorcycle in a vehicle, said motorcycle stowing device comprising:

a base constructed and arranged for placement in said vehicle;

a motorcycle support ramp pivotally connected to said base;

a loading ramp detachably assembled to said support ramp, said loading ramp including a pair of side channels and a cooperating base plate; and at least one support panel connected to said loading ramp, wherein said at least one support panel is constructed and arranged to insert into one of said side channels.

3. A modular motorcycle stowing device for transporting a motorcycle in a vehicle, said motorcycle stowing device comprising:

a collapsible base constructed and arranged for placement in said vehicle, said collapsible base including two primary portions with one portion telescopingly received within the other portion;

a collapsible motorcycle support ramp pivotally connected to said base, wherein said collapsible support ramp includes two primary sections with one section telescopingly received within the other section; and a loading ramp detachably assembled to said support ramp, said loading ramp being constructed and arranged with an upper loading ramp portion and a lower loading ramp portion detachably connected to said upper loading ramp portion, wherein each loading ramp portion includes a pair of support panels assembled thereto.

4. The modular motorcycle stowing device of claim 3 wherein one of said two primary sections includes a hinge bar.

5. The modular motorcycle stowing device of claim 4 wherein one of said two primary portions includes a receiving channel for receipt of said hinge bar.

* * * * *